United States Patent
Boerner

(10) Patent No.: US 7,461,803 B2
(45) Date of Patent: Dec. 9, 2008

(54) MULTI GRATER

(75) Inventor: Juergen Boerner, Landscheid-Niederkail (DE)

(73) Assignee: Boerner Kunststoff-und Metallwarenfabrik GmbH, Landscheid-Niederkail (DE)

( * ) Notice: Subject to any disclaimer, the term of this patent is extended or adjusted under 35 U.S.C. 154(b) by 0 days.

(21) Appl. No.: 11/899,626

(22) Filed: Sep. 5, 2007

(65) Prior Publication Data
US 2008/0029631 A1 Feb. 7, 2008

Related U.S. Application Data

(63) Continuation of application No. PCT/EP2006/000194, filed on Jan. 11, 2006.

(30) Foreign Application Priority Data
Mar. 8, 2005 (DE) .................. 10 2005 011 310

(51) Int. Cl.
*B02C 19/20* (2006.01)
(52) U.S. Cl. .................... 241/273.1; 241/168
(58) Field of Classification Search .............. 241/95, 241/100, 168, 273.1
See application file for complete search history.

(56) References Cited

U.S. PATENT DOCUMENTS

| | | | |
|---|---|---|---|
| 1,160,043 A * | 11/1915 | Clark | 241/273.1 |
| 2,482,180 A | 9/1949 | Heard | |
| 2,615,486 A * | 10/1952 | William | 241/168 |
| 2,714,908 A * | 8/1955 | Carmack | 241/95 |
| 2,720,234 A * | 10/1955 | Fett | 241/273.1 |
| 4,212,431 A * | 7/1980 | Doyel | 241/100 |
| 4,662,083 A | 5/1987 | Carter et al. | |
| 4,928,893 A | 5/1990 | Prindle | |
| 5,083,734 A * | 1/1992 | Ancona et al. | 248/687 |
| 5,711,491 A * | 1/1998 | Molo | 241/95 |
| 6,135,375 A | 10/2000 | Kaposi et al. | |
| 2005/0006505 A1 | 1/2005 | McNeeley et al. | |

FOREIGN PATENT DOCUMENTS

DE 26 40 778 3/1978

OTHER PUBLICATIONS

International Search Report and Written Opinion for related application PCT/EP2006/000194, European Patent Office, 9 pp., Apr. 12, 2006.

* cited by examiner

*Primary Examiner*—Faye Francis
(74) *Attorney, Agent, or Firm*—Klarquist Sparkman, LLP.

(57) ABSTRACT

A multi grater for material to be grated, such as fruit, vegetables, cheese, nuts, etc. comprises at least three, but preferably four or six grating devices which each have a specific grating function and are connected to one another at their edges. Thus, a grater body of polygonal cross section is formed with a cavity into which grated material is discharged. The grater body further comprises an insert which can be inserted into the cavity and is suitable for receiving the grated material.

17 Claims, 4 Drawing Sheets

MULTI GRATER

REFERENCE TO RELATED APPLICATIONS

This is a continuation of International Application No. PCT/EP2006/000194, filed Jan. 11, 2006, which was published under PCT Article 21(2), which in turn claims the benefit of German Application No. 10 2005 011 310, filed Mar. 8, 2005. These applications are incorporated by reference herein.

BACKGROUND

The present invention relates to a multi grater for material to be grated, such as fruit, vegetables, cheese, nuts, etc., with at least three, but preferably four or six grating devices which each have a specific grating function and are connected to one another at their edges, thus forming a grater body of polygonal cross section with a cavity into which grated material is discharged.

A multi grater of this type is known in general under the designation square grater (or 4-edged grater).

A square grater of this type has four grating devices which are each of approximately rectangular design. The four grating devices are connected to one another at their longitudinal edges, thus forming a grater body of approximately square cross section. The grater body is hollow.

A handle is usually provided at the upper end of the grater body.

Material to be grated can be guided along the outer surfaces of each of the four grating devices in a customary manner under the application of pressure in order thereby to produce grated material which drops into the interior of the grater body.

In use, square graters of this type are frequently held somewhat obliquely, and therefore the particular grating device which is actually used, points obliquely upward. In this case, the grated material drops out of the lower side of the grater body onto a support, for example a kitchen board (cutting board) or the like.

It is also known to place square graters of this type directly onto a container into which the grated material drops.

It is also known to provide separate grating devices for the particular different purposes. A grating device of this type may then also be placed onto a container, for example, in an approximately horizontal position. It is also known to provide an encircling groove on the container in the upper edge region, into which a grating device can be pushed, and therefore grated material drops into the container.

SUMMARY

Against this background, described below is a more universal multi grater.

In one implementation of the new multi grater, the grater body is provided with an insert which can be inserted into the cavity and is suitable for receiving the grated material.

The effect which can be achieved with the new multi grater is that the grated material drops directly into the insert during the grating operation and therefore, after removal from the cavity of the grater body, is directly "available."

In the case of conventional square graters, placing them onto a container is generally relatively problematic since it is generally not possible to obtain a stable position of grater and container.

In the case of customary use, the grated material is first to be transferred from a kitchen board or the like into a container, for further processing.

All of these disadvantages can be avoided with the multi grater according to the invention which has the grater body with the associated insert.

In the present context, the term grating device is to be understood in a generally broad sense. It may involve any type of grater, such as a cheese grater, nutmeg grater, raw vegetable grater, fried potato grater, etc. However, the term grating device is also to include slicers and the like, such as V-shaped slicers, waffle cutters, etc.

Several advantages are therefore fully achieved.

In a preferred embodiment, the insert has, in cross section, a polygonal shape matched to the grater body.

This makes it possible to match the shapes of the grater body and of the insert to each other in such a manner that as large a quantity as possible of the grated material (in the ideal case, 100%) passes into the insert.

In this case, however, the insert does not necessarily have to be provided in a cross section with the same polygonal shape as the grater body. For example, the grater body may be of hexagonal design, whereas the insert is of quadrilateral design in cross section.

According to a further preferred embodiment, the insert can be inserted into the cavity in different positions depending on which grating device is to be used.

The effect which can be achieved by this measure is that, no matter which grating device is used, grated material always reliably drops into the insert. Different positions may arise in that the insert is inserted in different rotational positions with respect to the grater body. However, different positions may generally also arise in that the insert is inserted into the grater body to a differing depth.

In this case, means are preferably provided which, when the insert is inserted, make it possible to see in which position the insert is inserted into the cavity.

This may be, for example, a projection which is provided on the insert and indicates in which direction or position the insert is arranged in order to receive grated material. It goes without saying that a projection of this type should then be visible on the multi grater even when the insert is inserted into the grater body.

It is furthermore advantageous if the insert is designed as a hollow body for receiving the grated material, the insert being closed in the lower region and, in cross section, being open toward one side, and the grated material passing via the open side into the insert.

In this embodiment, the insert is designed as a type of container which can be arranged in the cavity in such a manner that grated material which is discharged into the cavity is immediately taken into the container insert.

In this connection, it is also preferred if a fruit holder for securely grasping material to be grated can be stowed in the insert when not in use.

Overall, it is also preferred if a lower end of the grater body is open, and if the insert can be introduced into the cavity via the lower open end.

In this embodiment, the insert can accordingly be introduced into and removed from the grater body in the manner of a "drawer", also in order to introduce it into the cavity in different positions.

According to a further preferred embodiment, a stop is provided on the grater body and/or on the insert in order to limit the extent to which the insert is inserted or introduced.

The effect achieved by this is that the insert, when inserted, always adopts a defined relative position to the grater body.

It is also advantageous if the insert has, at its lower end, a lateral extension piece which serves as the stop.

In a preferred refinement, the lateral extension piece may also serve to indicate to a user from the outside in which position the insert has just been introduced into the grater body.

According to a particularly preferred embodiment, the lateral extension piece protrudes in relation to a side of the insert that lies opposite an opening of the insert.

The effect achieved by this is that, when the opening of the insert points upward within the cavity of the grater body (i.e. is arranged in order to receive grated material), the lateral extension piece protrudes downward. This makes it possible for the lateral extension piece to point downward in this position and to be arranged in a suitable manner for support on an underlying surface. In other words, the entire arrangement of grater body and insert is supported during a grating operation on the lateral extension piece of the insert, with the latter being pressed inward into the cavity.

The insert is therefore fixed in the cavity while a grating operation is being carried out.

Since the multi grater is generally held somewhat diagonally during use, a particularly ergonomic handling of the multi grater arises.

It is also particularly preferred if an elastic edge serving for protection against slipping is formed on the extension piece.

In this embodiment, the extension piece can be used as a non-slip support during use. This makes it possible to prevent the multi grater from sliding away from a user during operation. Injuries can therefore also be avoided.

Overall, it is furthermore preferred if a latching member or latching means are provided on the grater body and/or on the insert in order to fix the insert in a working position on the grater body.

The effect achieved by this is that the insert is not unintentionally detached from the cavity even if, for example, the grater body is raised. It can therefore be avoided that grated material which has already been trapped is accidentally spilled.

In general, it is also conceivable to latch the insert to the grater body at differing depths, depending on which grating device is to be used.

In this case, it is particularly advantageous if the latching means on the inside of at least one grating device have a latching projection.

By means of this measure, it is possible to engage behind an existing edge or corner of the insert in the working position, and therefore a latching mounting of the insert in the grater body is made possible in a simple manner.

According to a further preferred embodiment, the grater body is provided in the region of at least some of its edges with a profile such that longitudinal guide webs of the insert can be guided therein.

The effect achieved by this is that the insert is guided in a defined manner upon insertion into the cavity. It can also be achieved that, even when there are comparatively large tolerances, the insert can be held securely in the grater body.

Furthermore, it is overall advantageous if the insert is provided with a handle in the region of its lower end.

It is thereby possible in a simple manner to pull the insert out of the cavity of the grater body in order to supply the grated material to a further use.

According to a further preferred embodiment, the grater body is open in the region of its upper end or has at least one opening.

By this means, it is possible to press an insert, which can be inserted from below into the grater body, out of the cavity via the opening in a simple manner.

It goes without saying that the features mentioned above and those which have yet to be explained below can be used not only in the respectively stated combinations but also in other combinations or on their own without departing from the scope of this application.

BRIEF DESCRIPTION OF THE DRAWINGS

Exemplary embodiments are illustrated in the drawings and are explained in more detail in the description below.

DETAILED DESCRIPTION

Figure 1:
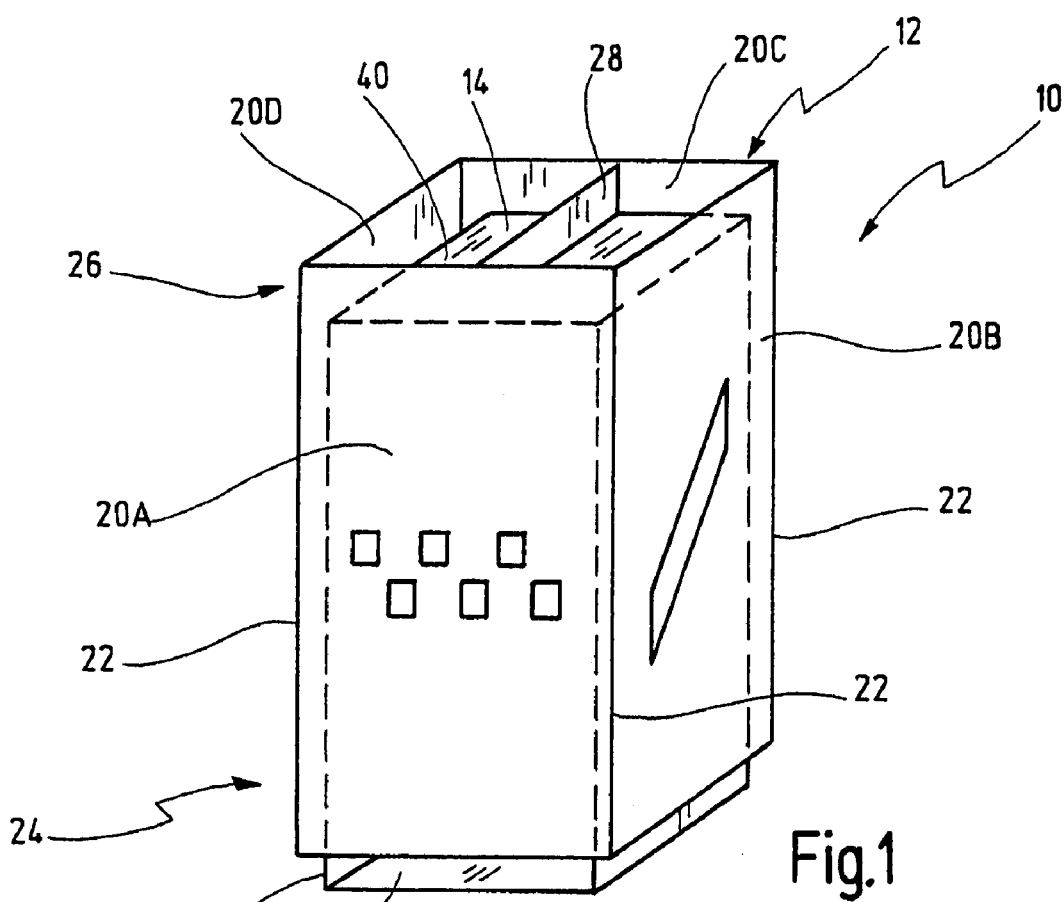
FIG. 1 shows a perspective schematic view of a first embodiment of a multi grater.
Figure 2:
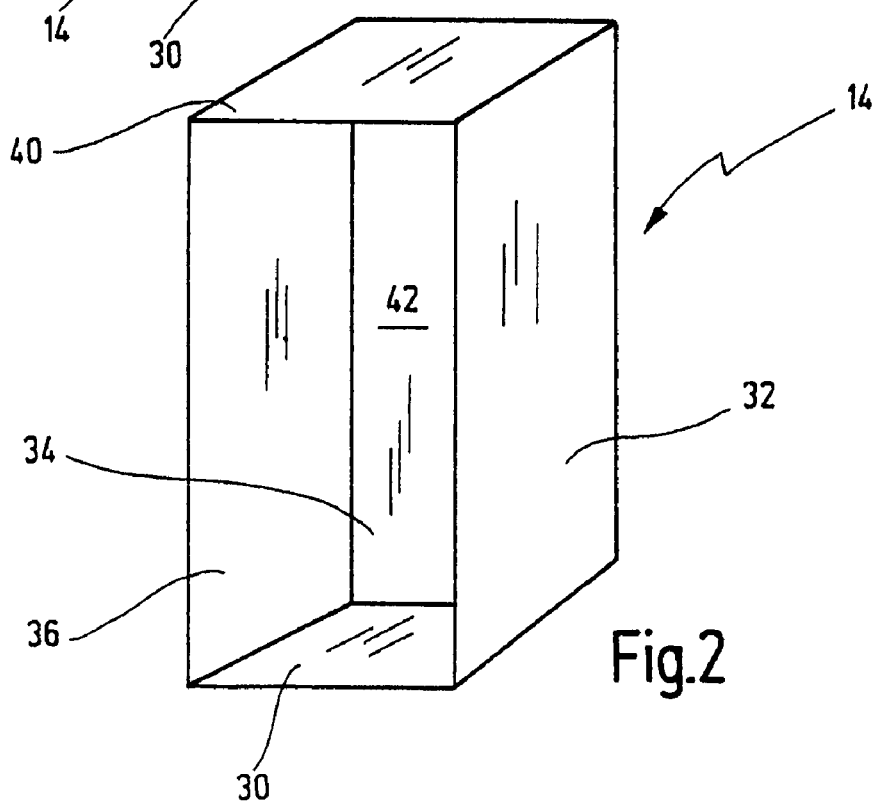
FIG. 2 shows a perspective schematic view of an insert of the multi grater of FIG. 1.
Figure 3:
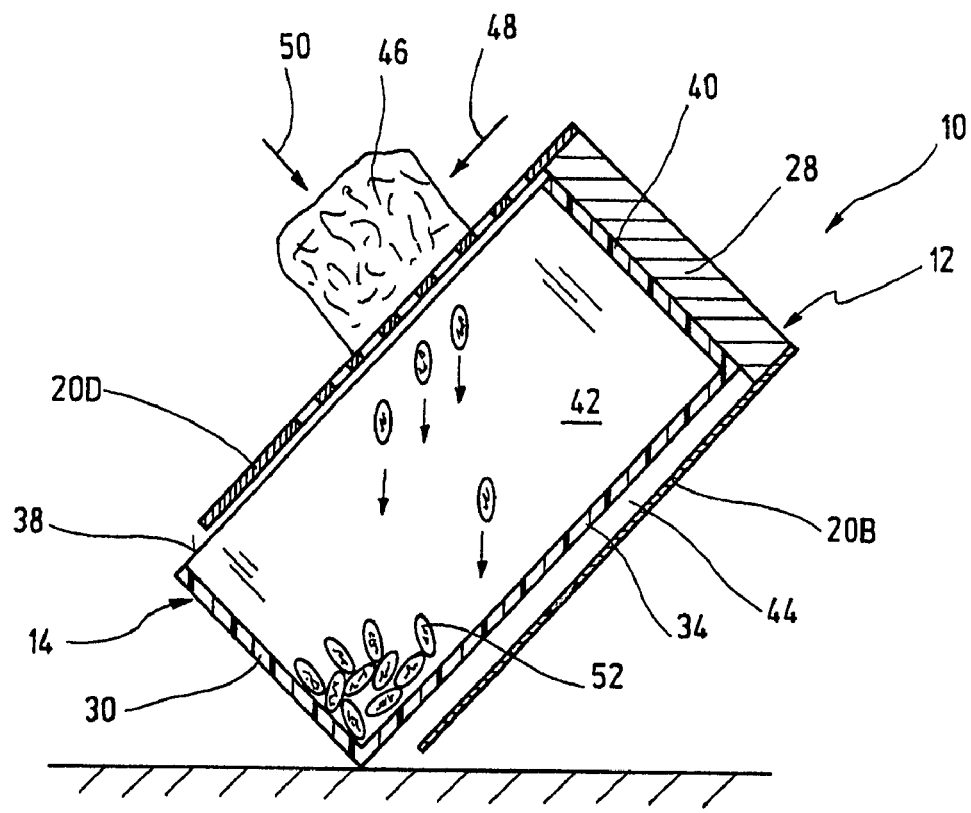
FIG. 3 shows a longitudinal sectional view through the multi grater of FIG. 1 during the use.

In FIGS. 1 to 3, a first embodiment of the multi grater according the invention is referred to in general by 10.

The multi grater 10 has a grater body 12 and an insert 14.

The grater body 12 has four grating devices 20A, 20B, 20C, 20D which are connected to one another at their longitudinal edges 22, to be precise in such a manner that a grater body 12 of approximately square cross section is formed.

The interior of the grater body 12 is hollow. Put more precisely, the grating devices 20 enclose a cavity between them.

A lower region of the multi grater is denoted in FIG. 1 by 24. An upper region is denoted by 26.

In the upper region 26, the grater body 12 has a handle 28 which, in the embodiment, extends between two opposite grating devices, in the present case the grating devices 20A and 20C.

The insert 14 is designed in the manner of a drawer and can be introduced from below into the cavity of the grater body 12. The insert 14 is preferably visible in a latching manner on the grater body 12 although this is not illustrated specifically.

In the lower region 24, the insert 14 has a base 30. Furthermore, the insert 14 has a first side wall 32, a second side wall 34 and a third side wall 36 which form a U shape in cross section. A side 38 lying opposite the second side wall 34 is designed as an open side.

In the upper region 26, a cover 40 is provided opposite the base 30.

The base 30, the cover 40 and the three side walls 32, 34, 36 enclose a receiving space 42 for grated material.

As shown in FIG. 3, the length of the insert 14 is selected with respect to the length of the cavity 44 surrounded by the grating devices 20 in such a manner that, during use, the insert 14 protrudes somewhat in relation to the lower end of the friction body 12.

By this means, it is possible, during use, to place the multi grater 10 on the insert 14, with the latter being fixed in the grater body 12 by pressure on the grater body 12 from above even if there is not to be any latching means.

For this purpose, a stop is provided. In the embodiment illustrated, the stop is formed by the handle 28, which runs in the transverse direction, of the grater body 12.

The insert 14 can be inserted into the cavity 44 in four different positions with respect to the grater body 12, to be precise in such a manner that the open side 38 points in each case to one of the grating devices 20.

FIG. 3 shows that the open side 38 points toward the grating device 20D.

Accordingly, the multi grater 10 is placed with the opposite edge of the base 30 onto a support (not denoted specifically), such as a cutting board or the like, thus resulting in the preferred diagonal position of the multi grater 10.

Material 46 to be grated, such as, for example, fruit, vegetables, nuts, cheese, etc., is now placed onto the outside of the grating device 20D and pressed against it with a low force, as shown at 50. Furthermore, the material 46 to be grated is moved in the longitudinal direction of the grating device 20D, as shown at 48.

By this means, grated material 52 drops through corresponding openings in the grating device 20D firstly into the cavity 44 and, via the open side 38, into the receiving space 42 of the insert 14.

After use, the insert 14 can be removed in a simple manner from the cavity 44 and the grated material 52 trapped therein can be supplied to a further use.

If a different material to be grated is to be grated using a different grating device (e.g. 20B), the insert 14 is inserted into the cavity 44 in the position assigned precisely to this grating device, and a new grating operation can be performed.

It goes without saying that, owing to the fact that the insert 14 rests during use on the underlying surface (kitchen board or cutting board), a latching between the grater body 12 and the insert 14 is not absolutely necessary. Nevertheless, latching of this type may be provided in order to avoid the insert 14 from being accidentally detached from the grater body 14.

In every case, the insert 14 can also be pushed out of the cavity 44 from the lower opening by pressure being applied through the upper opening of the grater body 12. If no latching means is present, the grater body 12 may also simply be pulled away upward, with the insert 14 then generally being picked up with the other hand as soon as it is sufficiently easily graspable.

The grating devices 20 may be of any desired type. Any type of grater may be involved, such as a cheese grater, nutmeg grater, raw vegetable grater, fried potato grater, etc. However, the term grating device is also to include slicers and the like, such as V-shaped slicers, waffle cutters, etc.

Accordingly, it is not absolutely necessary for the outsides of the grating devices 20 to be flat. The outsides of the grating devices 20 may also be offset, as is customary, for example, in the case of vegetable slicers.

The insert 14 is preferably designed in order to receive a holder (not illustrated). When not in use, the holder for the material 46 to be grated can consequently be stowed in the receiving space 42, and therefore overall a compact stowing is also possible.

In the embodiment illustrated, the grater body 12 is produced from metal and the insert 14 is produced from plastic.

However, the grater body 12 and the insert 14 may also both be produced from metal or both from plastic.

Figure 4:
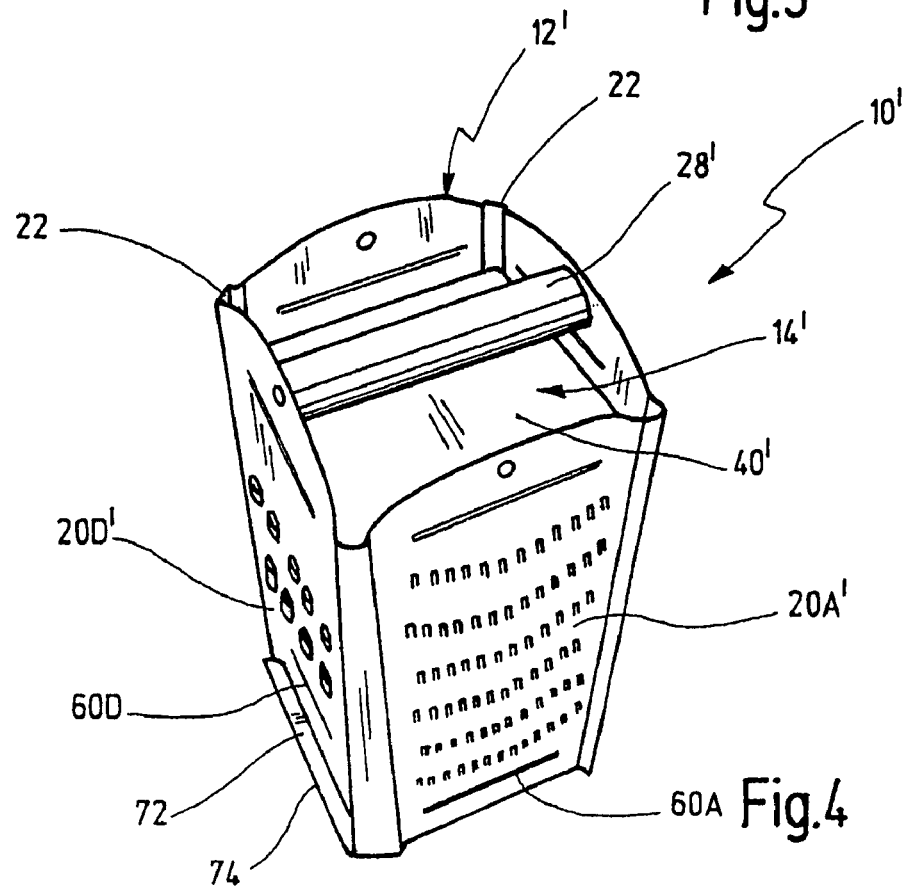
FIG. 4 shows a schematic perspective view of a multi grater according to a further embodiment.
Figure 5:
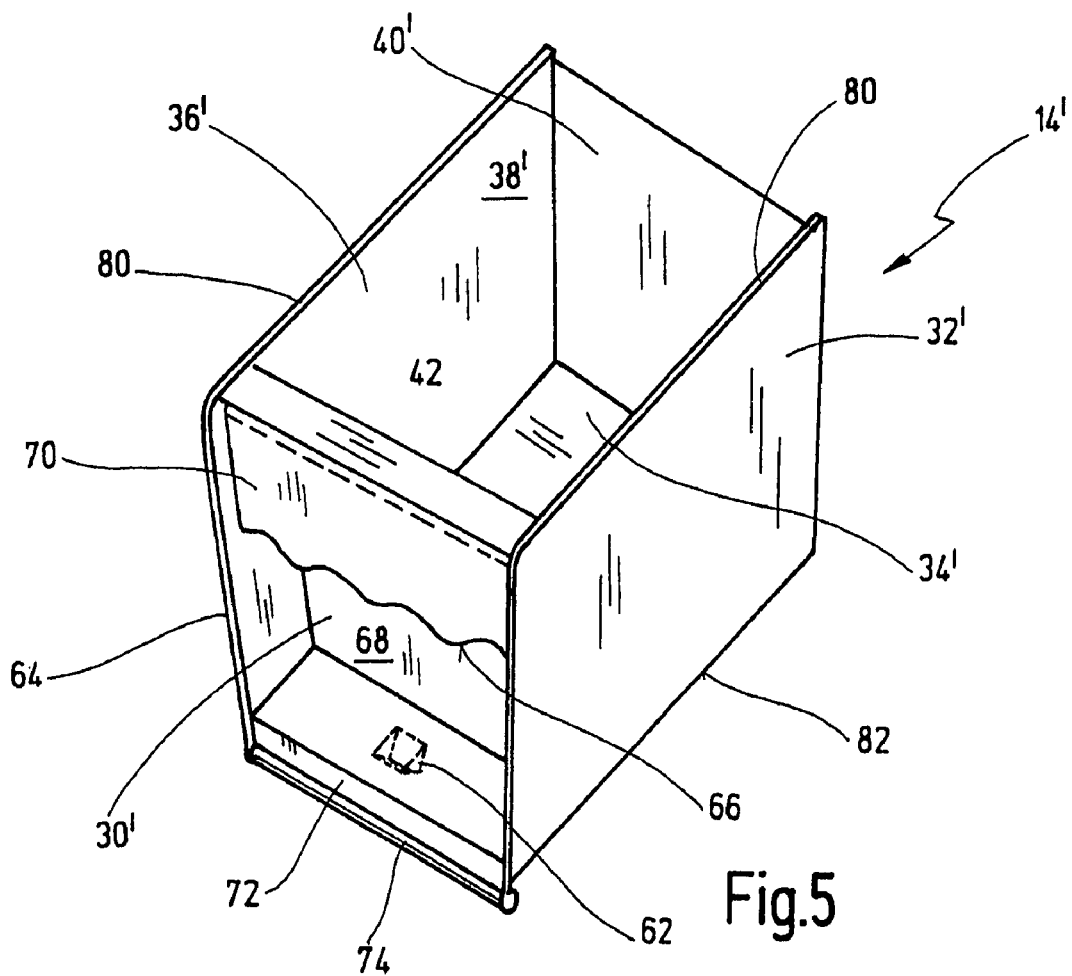
FIG. 5 shows a perspective view of an insert of the multi grater of FIG. 4.
Figure 6:
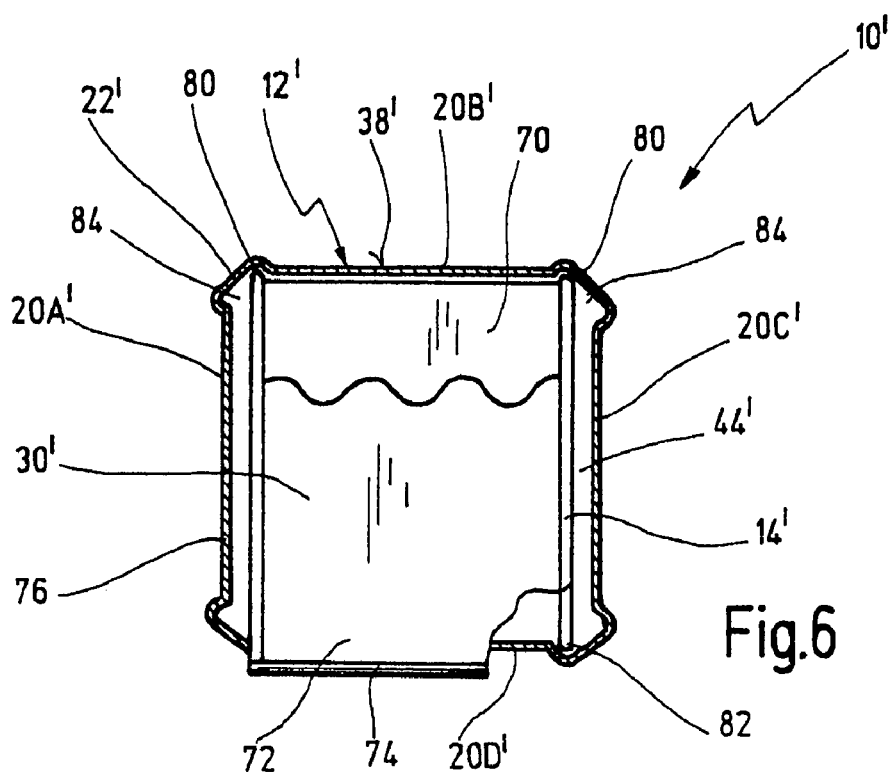
FIG. 6 shows a partially broken-away view of the multi grater of FIG. 4 from below.

FIGS. 4 to 6 show a further embodiment of a multi grater according to the invention which is denoted in general in these figures by 10'.

The multi grater 10' generally corresponds with regard to construction and manner of operation to the multi grater 10 of FIGS. 1 to 3. Only the differences between these multi graters are explained below.

As shown in FIG. 4, a bead 60A, 60B, etc. is formed in each case in the lower region of the grating devices 20A', 20B', said bead forming an inwardly protruding latching projection.

A latching projection 62 is formed on the insert 14', as shown schematically in FIG. 5, and, in the embodiment illustrated, protrudes outward in relation to the second side wall 34'.

When the insert 14' is inserted, the latching projection 62 of the insert 14' engages in each case behind the bead 60 of the grating device 20, which lies opposite the grating device used.

The insert 14' has a lower end 64, in the region of which a handle section 66 is formed. The handle section 66 makes it possible to pull the insert 14' out of the grater body 12' in a simple manner.

For this purpose, the base 30' of the insert 14' is offset in relation to the lower end 64, thus forming a handle space 68. A handle plate 70 protrudes from the region of the open side 38' in the direction of the opposite side 34' and is spaced apart in relation to the base 30' and consequently can be engaged behind.

However, it goes without saying that this type of handle section 66 merely constitutes a preferred configuration for forming a handle on the lower side of the insert 14'.

On the central side wall 34', i.e. the side lying opposite the opening 38', a lateral extension piece 72 is formed on the insert 14' in the region of the lower end 64.

The lateral extension piece 72 is shaped in relation to the grater body in such a manner that, when inserted, it protrudes laterally in relation to the grater body 12' and therefore forms a stop. In other words, the insert 14' can be pushed into the cavity 44' until the extension piece 72 strikes against the lower side of one of the grating devices 20'. The lower end of the grater body 12' is denoted in FIG. 6 by 76.

This embodiment has the advantage that a handle 28' can be fully grasped in the working position of the insert 14', thus achieving better ergonomics overall.

In other words, in this embodiment, the handle 28' does not serve as a stop but rather is spaced apart from the cover 40' in the working position of the insert 14'.

A rubber strip 74 is fitted to the protruding edge of the extension piece 72.

Since the extension piece 72 lies opposite the open side 38', the multi grater 10' is placed during use on the outer edge and therefore on the rubber strip 74. Slip resistance is thereby realized.

The mutually opposite side walls 32', 36', which enclose the open side 38' between them, are provided, in the region of the open side 38', with longitudinal guide webs 80 which protrude in relation to the cover 40' and the base 30'.

Corresponding longitudinal guide webs 82 are formed on the insert 14' in the region of the opposite side 34'.

Furthermore, the edges 22' of the grater body 12' are designed as pockets 84.

As can be gathered in particular from FIG. 6, the longitudinal guide webs 80, 82 of the insert 14', when inserted, engage in the pockets 84.

The effect achieved by this is that the insert 14' can be fixed in each case to the grater body 12' in such a manner that the open side 38' of the insert 14' is arranged directly behind the inside of the grating device used in each case (grating device 20B' in FIG. 6). It can be achieved that all of the grated material 52 drops into the receiving space 42.

Figure 7:
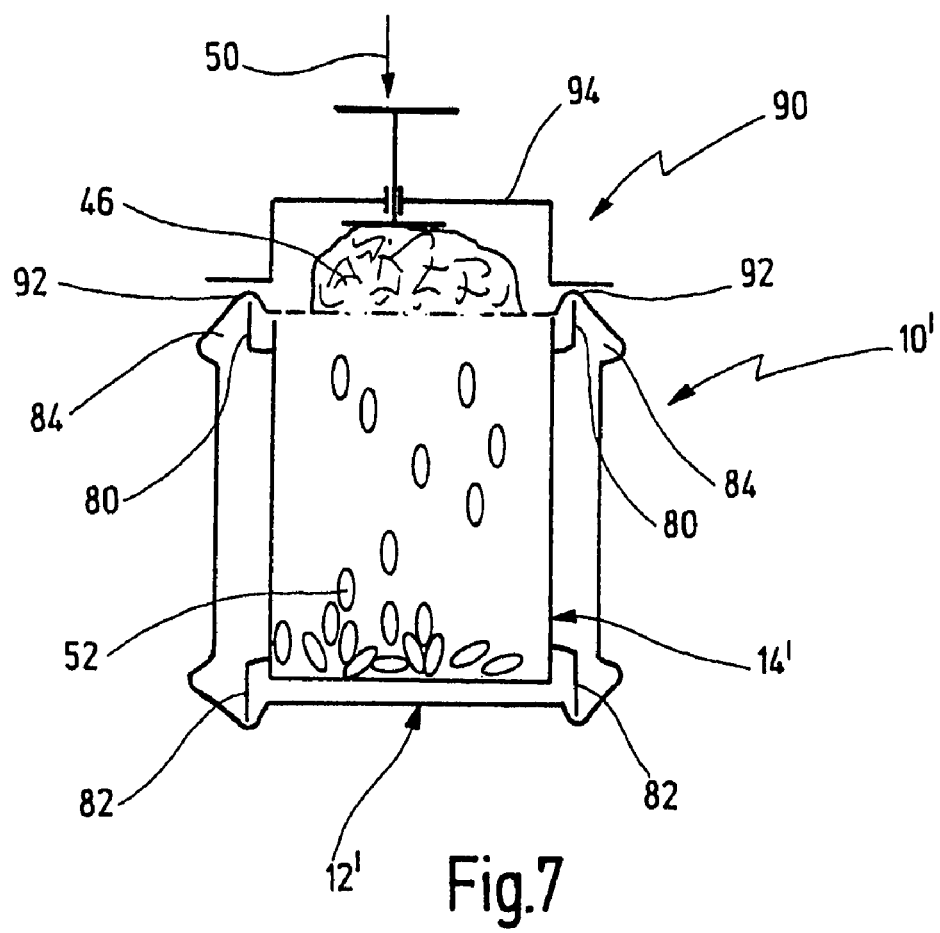
FIG. 7 shows a schematic view corresponding to FIG. 6 when a fruit holder is used.

FIG. 7 shows the use of the multi grater 10' in conjunction with a fruit holder 90 which is known per se.

The fruit holder 90 serves to securely grasp the material 46 to be grated and has a housing 94 with a cavity for receiving the material 46 to be grated. Furthermore, the fruit holder 90 contains a slide 96 which is mounted displaceably on the housing 92 and on which the contact pressure 50 is exerted.

The multi grater 10' is preferred for use with the fruit holder 90, since the pockets 84 on the sides of the particular grating devices form projections 92 on which the fruit holder 90 rests and can be guided in the longitudinal direction.

In this case, the longitudinal guide webs 80, 82 are guided in the interior of the projections 92, and therefore the pockets 84 advantageously have a dual function.

It is furthermore preferred if the receiving space 42' of the insert 14' is designed in order to receive the fruit holder 90 when not in use. By this means, the overall device 10', 90 can be stowed compactly.

Figure 8:
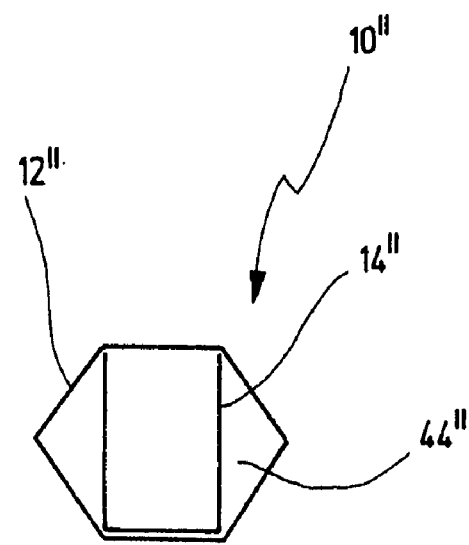
FIG. 8 shows an illustration corresponding to FIG. 6 of a further alternative embodiment of the multi grater.

FIG. 8 shows a further alternative embodiment of a multi grater 10" according to the invention.

In the case of the multi grater 10", the grater body 12" is of hexagonal design in cross section. The insert 14" is of approximately rectangular design in cross section. However, it goes without saying that an insert of hexagonal cross section can also be introduced into the grater body 12".

What is claimed is:

1. A multi grater for material to be grated, with at least three grating devices which each have a specific grating function and are connected to one another at their edges, thus forming a grater body of polygonal cross section with a cavity into which grated material is discharged, wherein the grater body comprises an insert having an opening which can be inserted into the cavity and is suitable for receiving the grated material, wherein the insert has, at its lower end opposite to the opening, a lateral extension piece, and wherein an elastic edge serving for protection against slipping is formed on the extension piece.

2. The multi grater as claimed in claim 1, wherein the insert has, in cross section, a polygonal shape matched to the grater body.

3. The multi grater as claimed in claim 1, wherein the insert can be selectively inserted into the cavity in different positions depending on which grating device is to be used.

4. The multi grater as claimed in claim 1, wherein the insert is designed as a hollow body for receiving the grated material, the insert being closed in the lower region and, in cross section, being open toward one side, the grated material passing via the open side into the insert.

5. The multi grater as claimed in claim 1, wherein a lower end of the grater body is open, and wherein the insert can be introduced into the cavity via the lower open end.

6. The multi grater as claimed in claim 5, wherein the lateral extension piece serves as a stop.

7. The multi grater as claimed in claim 1, wherein a stop is provided on at least one of the grater body and the insert in order to limit the extent to which the insert is inserted into the cavity.

8. The multi grater as claimed in claim 1, wherein the lateral extension piece protrudes in relation to a side of the insert that lies opposite an opening of the insert.

9. The multi grater as claimed in claim 1, wherein a latching member is provided on at least one of the grater body and the insert in order to fix the insert in a working position on the grater body.

10. The multi grater as claimed in claim 9, wherein the latching member comprises a latching projection on the inside of at least one grating device.

11. The multi grater as claimed in claim 1, wherein the grater body is provided with profiles, each of the profiles being positioned near a respective one of the edges, wherein longitudinal guide webs of the insert can be guided within the profiles.

12. The multi grater as claimed in claim 1, wherein the insert is provided with a handle in the region of its lower end.

13. The multi grater as claimed in claim 1, wherein the grater body is open in the region of its upper end.

14. A multi grater for material to be grated with at least three grating devices which each have a specific grating function and are connected to one another at their edges, thus forming a grater body of polygonal cross section with a cavity into which grated material is discharged, wherein the grater body comprises an insert which can be inserted into the cavity and is suitable for receiving the grated material, wherein the insert has, at its lower end, an extension piece which serves as a stop in order to limit the extent to which the insert is inserted or introduced, and wherein an elastic edge serving for protection against slipping is formed on the extension piece.

15. The multi grater as claimed in claim 14, wherein a latching member is provided on at least one of the grater body and the insert in order to fix the insert in a working position relative to the grater body.

16. The multi grater as claimed in claim 14, wherein the latching member comprises a latching projection on the inside of at least one grating device.

17. The multi grater as claimed in claim 14, wherein the grater body is provided with profiles, each of the profiles being positioned near a respective one of the edges, wherein longitudinal guide webs of the insert can be guided within the profiles.

* * * * *